July 9, 1968 W. H. PRAHL 3,391,910
PHASE CONTACTING DEVICE AND PACKING FOR USE IN SAME
Filed May 3, 1967 2 Sheets-Sheet 1
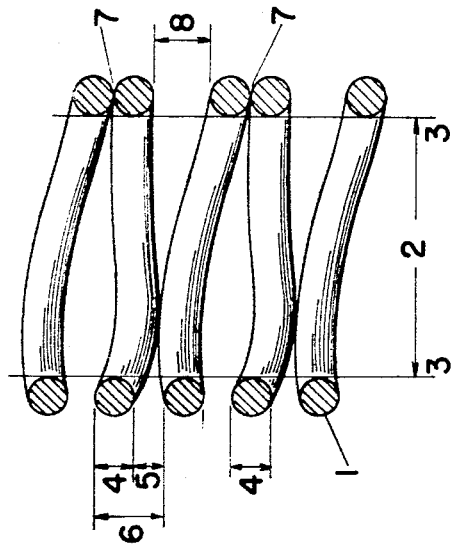
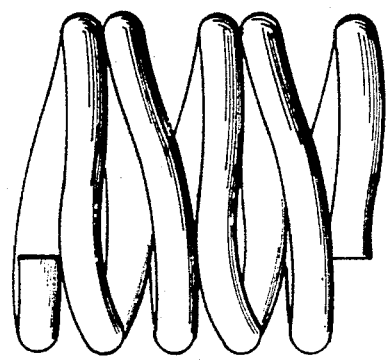
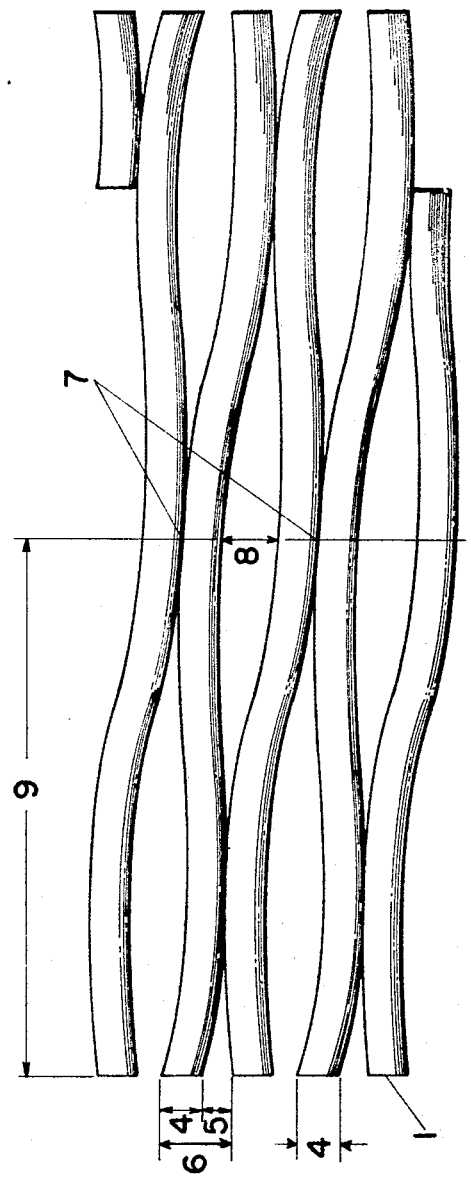
INVENTOR.
BY WALTER H. PRAHL July 9, 1968 W. H. PRAHL 3,391,910
PHASE CONTACTING DEVICE AND PACKING FOR USE IN SAME
Filed May 3, 1967 2 Sheets-Sheet 2

INVENTOR.
WALTER H. PRAHL,
BY
Bailey, Stephens & Huettig
ATTORNEYS

United States Patent Office 3,391,910
Patented July 9, 1968

3,391,910
PHASE CONTACTING DEVICE AND PACKING
FOR USE IN SAME
Walter H. Prahl, P.O. Box 926, Station C,
Buffalo, N.Y. 14209
Filed May 3, 1967, Ser. No. 635,790
7 Claims. (Cl. 261—94)

ABSTRACT OF THE DISCLOSURE

A phase contacting device is randomly packed with members in the form of helical coils with spaced turns of such dimensions as to reduce or prevent bridging while encouraging the suspension of droplets; the coils are sinuous and preferably touch the adjacent coils at least once in each turn.

BACKGROUND OF THE INVENTION (1) *Field of the invention*

The invention relates to packing members for use in phase contacting devices such as are used for fractional distillation, absorption, extracting and the like, and to phase contacting devices using such packing members.

DESCRIPTION OF THE PRIOR ART

One of the most common examples of phase contacting devices is the packed distillation, absorption or extraction tower or column, a vertical hollow cylinder partly filled with packing elements, such as Raschig rings, Berl Saddles, Pall rings, etc., through which the lighter phase, vapor, gas, or liquid of lower density, respectively, moves upward, while the heavier phase moves downward, and in which the phases are broken up by the packing into small streams passing over the surface of the packing, thereby providing the intimate contact over large surfaces which is the prerequisite of efficient phase contacting operation. Essentially the same principles applicable to towers or columns apply to other packed devices used in phase contacting operation.

Numerous shapes and sizes of packing elements have been suggested in order to improve capacity, efficiency, economy and other properties of packed phase contacting equipment, yet there remain considerable shortcomings which handicap the essentially simple and economic packed tower in its competition with other phase contacting devices. Some of such shortcomings are high resistance, limited range of applicability, difficulty in manufacture, particularly in ceramic material, and others.

Such packing elements include double helical coils (Bregeat, 1,494,989); coils with unspaced turns (Darier, 1,327,422) and with turns spaced a very short distance apart.

SUMMARY

A purpose of this invention is to provide a packing element which offers a lower resistance than known packing elements, and thereby permits higher capacity or smaller size for phase contacting devices packed with it. Another purpose is to provide a packing element which extends the area of usability of packed distillation towers into the low pressure range and that of absorption towers into the low irrigation range. Another purpose is to provide a packing element which is easy to manufacture from metallic, ceramic, or plastic materials. Another purpose is to provide packed phase contacting devices of superior capacity, efficiency, and extended range. Other purposes will become apparent in the course of the description.

It has now been found, according to the present invention, that a packing element of the form hereinafter defined surpasses the existing packing elements in overall performance and achieves the purposes above.

The packing element according to this invention is in its preferred form a member in the form of a coil, the surface of which is essentially the surface generated by a closed curved having essentially equal dimensions in all directions, which contacts a closed cylindrical surface and which is in a plane perpendicular to said cylindrical surface at the point of contact and parallel to the generatrix of said cylindrical surface, when said closed curve is moved simultaneously, in a revolving motion over said cylindrical surface in a direction perpendicular to its generatrix, in a longitudinal motion along said cylindrical surface in a direction parallel to the generatrix of said cylindrical surface, and in an oscillatory or reciprocating motion along said cylindrical surface in a direction parallel to the generatrix of said cylindrical surface;

the length of the circumference of said closed curved being between about one-fourth and three inches; the length of the circumference of the directrix of said closed cylindrical surface being between about one and sixteen inches; the length of said longitudinal motion for each full revolution in said revolving motion being at least one-sixteenth of an inch in excess of the dimension of said closed curve in the direction of the generatrix of said cylindrical surface; the amplitude of said oscillating or reciprocating motion being substantial but not more than said excess of said longitudinal motion over the largest dimension of said closed curve in the direction of the generatrix of said cylindrical surface; and the dimension of said closed cylindrical surface in the direction of the generatrix being between about one-quarter inch and five inches.

BREIF DESCRIPTION OF THE DRAWINGS

For a more detailed understanding of the invention, reference is made to the following description of some representative embodiments of the invention and the figures illustrating them.

FIGURE 1 is a side view of one embodiment of this invention;

FIGURE 2 is a view of a middle cross-section of the embodiment represented by FIGURE 1;

FIGURE 3 shows the development of a radial projection of the embodiment of FIGURE 1 onto a concentric circular cylindrical surface.

DESCRIPTION OF THE PREFERRED EMBODIMENTS

Figure 4:
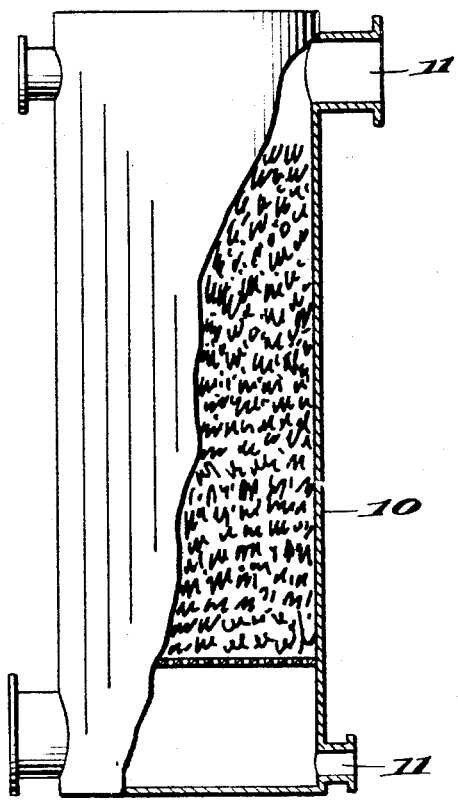
FIGURE 4 shows an apparatus using such packings.

The broad aim of any phase contacting device is to achieve a maximum of mass- and/or heat-transfer at a minimum of expense. The term expense comprises a large number of factors, such as capital expense for equipment and packing, expense of maintenancy, cleaning, etc. Technically, however, one of the most significant expenses is connected with the resistance. Much of the scientific and practical work done on the development of packings has been concentrated on the two concepts of efficiency, aiming at a maximum of heat or mass transfer in a minimum of volume, and resistance, aiming at a maximum of heat or mass transfer at a minimum of pressure drop. In devices depending on surface for phase contacts, there is obviously a correlation between surface and efficiency, and similarly, in devices in which fluids pass through a zone partly filled with packings, there is obviously a correlation between free "void" space and resistance.

The conception of surface and free void space thus occupies a dominant position not only in the scientific literature about packed phase contacting devices, but also in the practical development of industrial packing elements and packings.

Practically all industrial packings have been developed with the aim of achieving an optimum of performance by combining a maximum of surface with a maximum of void space. Since the sheet, having one dimension, the thickness, by an order of magnitude smaller than the other two dimensions, gives a relatively larger surface and a greater void space than wires or rods having two more or less equal dimensions, practically all packings in industrial use today are formed from sheet. Metallic packing elements are made by forming metal sheets into cylinders, saddles or other shapes. The same is true for plastic packing elements, and even ceramic packing elements emulate, as far as the nature of their material permits, the forms evolved for metal packings, employing the two dimensions of a surface, and keeping the thickness to the minimum dictated by the inherent fragility of the material.

Attempts to scale up to industrial size the many successful laboratory packings based on wires in the form of screen, helices and other shapes have not been successful. The reason is mainly the capillary behavior of the liquid. For example, a 0.5 mm. distance between 0.5 mm. wires of a wire screen used in a laboratory column is bridged over and filled out by the liquid, forming a solid sheet of liquid supported by the wire screen. Scaled up, for instance, by the ratio of 10:1, 5 mm. openings in a wire screen of 5 mm. diameter wires form a gap, unbridgeable by practically any liquid. In small scale packing elements, the wire serves only as the support for the large surface of the liquid, form by capillarity. In the analogous large scale packing elements, however, only the surface of the wire or rod is available. The consensus of the art was recently expressed by an expert to the effect that it had been found, in general, that it is not possible to satisfy existing commercial requirements for high area and high percent of void if an essentially round or square rod is used.

According to the present invention, however, it has now been found that packing elements of round or square rods and rods having similar cross-sections, although normally inferior to sheet-based packing elements in regard to void space and surface, are superior to them in resistance, efficiency and general usefulness, if certain criteria, to be described below, are observed in their form and relative dimensions.

The basic constituent of the packing element according to this invention is the wire or rod, of metal, plastic, ceramic or other material, that is a body having a cross-section of essentially equal dimensions in all directions, such as, for instance, a circle, an ellipse, a hexagon, a square, etc., as opposed to the conventionally used strip, in the cross-section of which the width is a multiple of the thickness. It has been found that under otherwise comparable circumstances the performance of a column packed with the packing elements of this invention increases as the dimensions of the cross-section of the rod used to form the packing element approach the full equality represented by the circle. In elliptical cross-sections, the performance decreases as the ratio of the long over the short axis increases, and this ratio preferably should not exceed 3:2. In angular cross-sections, the performance increases as the size of the angle increases. A regular octagon performs not quite as well as a circle, but is better than a hexagon, which in turn is superior to a square, etc. In practical application, the difference in performance under otherwise equal conditions between a circle and the inscribed octagon is barely noticeable, while the inscribed square shows a considerable, although under most circumstances tolerable, decrease in performance. The circle is thus the preferred form of the closed curve generating, according to the definition above, the surface of the packing element, with the ellipse of not too different axes, the polygon, etc., closely following.

The overall shape of the packing element is that of a cylinder of approximately equal measurement in the three dimensions. In the latter respect it follows the general experience that bodies of approximately equal height and diameter achieve a better randomization of position than bodies in which one dimension predominates. Regarding the shape of the cylinder, the circular cylinder is preferred, because it gives the least opportunity of mutual covering of surfaces. Cylinders having other closed curves as directrix, such as an ellipse, a polygon, etc., are suitable, provided that no one dimension unduly predominates.

In packing elements for laboratory or small scale columns, it is customary to use a form which promotes the filling of voids in the packing element with the liquid by means of capillarity. Thin wires are wound to cylindrical helices, having a distance between the wires of a few hundredths of an inch. Bodies are formed of wire screen having twenty or more meshes per inch. Bodies formed of sheet metal are provided with hundreds of perforations per square inch, etc. In all these cases, the aim, and the condition for satisfactory performance, is the filling of these voids with liquid by capillary action. Application of the same principle to large scale packing elements has been suggested several times. Except for special circumstances, these suggestions have not been successful. It has now been found, in this invention, that in industrial size packing elements it is essential to avoid capillary action as much as feasible, rather than aim for it.

It is true that the capillary bridging of gaps by liquid increases the surface.

It has been found now, however, that this gain in surface is more than offset by the simultaneous increase in resistance owing to the closing of the voids to the passage of vapor or gas.

The distance between the rods, and other factors necessary to avoid bridging by capillarity varies, of course, with the surface tension, viscosity, temperature and other factors. One of the most important factors in this respect in liquid-vapor or gas contacting devices is the irrigation rate, defined as volume of liquid divided by time and overall ("superficial") cross-sectional area of the column or other contacting equipment. Besides visual observation, a suitable means of determining whether the distance is large enough in any given case is to observe the rate of increase of resistance with the irrigation rate, and compare it with the same rate observed on equivalent packing elements not materially subject to the influence of capillarity, such as Raschig rings, Saddles, etc. It has been found that a distance of about one-sixteenth of an inch will prevent substantial bridging in some cases, a distance of about one-eighth of an inch is sufficient in most cases, while a distance of about one-half inch prevents it in practically all cases except close to the flooding point. The workable range thus extends from about one-sixteenth of an inch up, with a preferred range from about one-eighth of an inch to about one-half inch.

Another factor influencing the bridging tendency and other properties of the packing element is the thickness of the rod or wire, represented in case of a circular cross-section by the diameter of the wire or rod, in case of other shapes by the area of the closed curve representing the cross-section of the wire or rod divided by one-fourth of its circumference. Wires or rods below a certain thickness are not only mechanically too weak, impractical to manufacture in ceramic material, subject to excessive corrosion, etc., but in addition, they are not, under comparable circumstances, as effective as thicker rods or wires. One explanation, given for better understanding and not as part of the invention, may be that the drops of liquid always forming in a column develop a certain size more or less independent of the size of the packing element. A thin wire does not seem to have the surface necessary to hold the drop and guide it along a path following the wire, as the thicker the column without sufficient contact. It has been found that the packing elements made according to this invention lose their efficiency rapidly, as the diameter of the wire goes below about one-sixteenth of an inch. For best efficiency, combined with mechanical strength, resistance to corrosion and ease of fabrication in ceramic materials, a thickness between about one-eighth and one-half of an inch is preferred, with a workable range extending from about one-sixteenth to about one inch.

Although, as explained above, both the thickness of the wire or rod and the distance between the windings, are independently determined by other factors, it has been found that the ratio of these two factors has a bearing on the efficiency. Although all the ratios possible under the limitation above are workable, it has been found that the best results are obtained, if the ratio of the thickness of the rod to the distance lies between about 1:0.4 and 1:2, with a preferred range from about 1:0.6 to about 1:1.

If in the generation of the surface according to the definition above there were no oscillatory or reciprocating motion, the packing, as explained so far, would be a helical coil the turns of which would have essentially the same distance from each other throughout their length.

The present improvement is achieved by giving the windings of the helix an undulating shape, as it results when wave length and amplitude of the oscillating or reciprocating movement referred to above both are different from zero.

The resulting form may be visualized by bending a straight wire into the shape of, for instance, a sine curve, and then winding it, with the plane of the sine curve parallel to the surface of the cylinder, onto a, for instance, circular cylinder, observing the specifications and limitations set forth above. A packing of this shape offers several advantages: It increases the length of the wire, and thereby the surface, going into a packing element of given dimensions. It results, except where the circumference of the cylinder is an integral multiple of the wave length of the undulation, in a variation of the distance between the windings, thus increasing the probability of including the optimum distance for a larger number of operating conditions, and it mechanically strengthens the element.

The latter effect is particularly pronounced, if the amplitude of the undulation is equal to the average distance between the windings, and the wave length is equal to, or smaller than, the circumference of the cylinder. Under these conditions, the adjacent windings of the helix touch each other, giving support to each other, thus preventing most effectively compression, deformation and breakage of the element, and increasing its mechanical strength. The best results in these respects are obtained when the wave length of the undulation is equal to $2/n$ times the circumference of the cylinder, wherein $n$ is an odd integer. In that case, the points of contact lie in $n$ planes passing through the axis of the cylindner, giving maximum support to one another. The preferred value for $n$ is 3 or 5, but higher values of $n$ are not only usable, but are preferable in certain conditions, for instance, where the ratio of thickness of wire to distance between windings exceeds considerably the preferred range, given above, between about 1:0.6 to about 1:1. The thinner the rod or wire, in relation to the distance, the larger can be the value of $n$.

An embodiment of this invention is represented by FIGURES 1 to 3. In these figures, the closed curve generating and defining the cross-section of the wire or rod is circle 1. The directrix of the cylindrical surface is the circle with the diameter 2. Its generatrix is line 3. The largest dimension of the closed curve in the direction of the generatrix of the cylinder surface is the diameter 4 of circle 1. The amplitude of the reciprocating motion is equal to 5, and it has a wavelength of two-thirds of the circumference, $n$ being equal to 3. Preferably two adjacent windings touch each other, as at 7, while the distance 8 to the next pair equals twice the distance at 5.

In order to facilitate understanding of this shape, FIGURE 3 shows the projection of the body according to FIGURE 1, radially projected onto a concentric cylindrical surface, and developed. It could be visualized, for instance as the shadow of the body according to FIGURE 1, thrown onto a piece of paper wrapped around it, by a light moving along the axis of the cylinder, when this paper is spread out in a plane. The left end of FIGURE 3 corresponds to the left cross-section of FIGURE 2, while its center line corresponds to the right cross-section of FIGURE 2, with identical numbers having identical meanings. The distance 9 represents the part of the body shown in FIGURE 2.

Amplitude and wavelength of the oscillating motion may be selected, within the geometrically possible range, independently of other factors.

Regarding amplitude, its benefits increase, in general, with its size, until the full benefits are obtained with an amplitude sufficient to cause the turns to touch. Considerable benefits, however, in form of increased surface, greater probability of achieving optimum distance between turns for varying conditions, etc. can be achieved with smaller amplitudes. Such benefits are noticeable with an amplitude as small as ten percent of the average distance between the turns.

The wave length influences primarily the number and location of points of approach or contact. In order to have a sufficient number of contact points, a wave length smaller than the circumference of the directrix is preferred. In order to have the contact points essentially in the same plane passing through the axis of the cylinder, a wave length equal to about $2/n$ times the circumference of the cylinder, wherein $n$ is an odd integer, is preferred. $n$ is then the number of planes, passing through the axis of the cylinder, in which contact points lie. In FIGURES 3, 4 and 5 $n$ equals about 3, giving contact points in three planes forming angles of 120°. With $n$ equal to 5 or 7, the windings contact each other in 5, or 7, respectively, planes, giving greater rigidity. If $n$ is not an odd integer, the points of contact of the windings do not lie in a few planes, but are distributed, for instance, in form of a spiral, around the cylinder, giving a form which normally is not as rigid as if $n$ were an odd integer, but which may have other advantages. It is normally not advisable to select $n$ smaller than 1, or greater than about 10, with a preferred range of about 3 to 7.

A main advantage of such a contact element lies in its physical rigidity, which permits its fabrication and use in stone ware, glass, porcelain and other fragile materials, as well as in plastics and other materials of low rigidity.

A packing element made as a simple helix, manufactured of ceramic material, for instance porcelain, may be broken under the weight of heavy overlying layers, owing to the low flexural strength of porcelain. The form of the present invention, however, prevents compression and breaking by the mutual support offered by the contact of the windings. Each section of a winding, between points of contact, has to some extent the function of an arch, with the inherent strength of such structure, particularly if the points of contact are rigidly connected to each other, for instance in case of metal, by welding, in case of plastics by thermal junction, in case of glass or ceramic by fusion, sintering, etc., and in these and other cases by tying, clamping or other means of forming a solid connection. It is thus a part of this invention to join or connect adjacent windings at their points of contact, that is at points 7 in FIGURES 1 to 3, by means appropriate to the material of the packing.

The favorable effects of this invention are the result of the outside surface shaped according to the description. The material underneath the surface has no bearing on the performance of this packing. While in the preceding description for the sake of clarity the surface was represented as being the outside of a solid rod, it can just as well be the outside surface of a hollow rod, a tube, a pipe, a strip bent into the shape of a tube, or any other mechanically suitable object having an outside surface according to the description.

In order to save material and weight, a tube is particularly suitable as starting form for the manufacture of packing elements according to this invention in plastics or soft metals. The tube is passed first through a machine element impressing a waving shape on it, and is then wound on a cylinder, and cut, all operations being carried out according to the limitations as to size and shape given above. In order to prevent accumulation of liquid inside of the tube, it is advisable to provide perforations in the tube wall, spaced, for instance, with a distance equal to the diameter of the tube, and preferably on the side forming the outside of the cylinder. In case of hard metals, as for instance steel, it is advantageous to start with a strip, form it by longitudinal bending, into the shape of a tube, so that the edges of the strip are contacting, or are close, to each other, either having the edges unconnected or joining them, for instance, by spot welding, and then forming the packing element according to this invention out of this tubular object. It is obvious to those skilled in the art, that all these shaping operations are best performed in a continuous process, starting with an endless strip, and passing it continuously through the bending, waving, winding and cutting steps. Then natural draining action of the slot may be improved by providing additional drainage holes.

FIGURE 4 shows a container 10 with inlets and outlets 11 filled with a random mass of packing elements of the type disclosed herein.

While I have described herein some embodiments of my invention, I wish it to be understood that I do not intend to limit myself thereby except within the scope of the claims hereto or hereafter appended.

I claim:
1. A phase contacting device comprising a container having at least one inlet and outlet and, within the container, a randomly piled mass of packing elements comprising members in the form of coils, the average distance between successive turns of the coils being at least one-sixteenth inch, the longitudinal axis of the members deviating, in a direction parallel to the longitudinal axis of the coils, in opposite directions from a constant inclination at least once in each turn of the coils by an amount of at least 10% of such average distance.

2. In a device as claimed in claim 1, each turn touching the adjacent turns.

3. In a device as claimed in claim 1, each member having a cross-section the greatest and least dimensions of which do not vary by more than about 3:2 and the greatest dimension of which is between one-eighth and one inch, the ratio of the dimension of the cross-section in a direction parallel to the axis of the coil to the average distance between successive turns of the coil lying between 1:0.4 and 1:2, the length of the coil being substantially equal to its transverse dimensions.

4. In a device as claimed in claim 3, said ratio being between 1:0.6 and 1:1, and said distance being between one-eighth and one-half inch.

5. A packing member for phase contacting devices comprising a member in the form of a coil, the average distance between successive turns of the coil being at least one-sixteenth inch, the longitudinal axis of the member deviating, in a direction parallel to the longitudinal axis of the coil, in opposite directions from a constant inclination at least once in each turn of the coil by an amount of at least 10% of such average distance, each turn touching the adjacent turns in the normal condition of the coil.

6. A packing member as claimed in claim 5, the member having a cross-section the greatest and least dimensions of which do not vary by more than about 3:2 and the greatest dimension of which is between one-eighth and one inch, the ratio of the dimension of the cross-section in a direction parallel to the axis of the coil to the average distance between successive turns of the coil lying between 1:0.4 and 1:2, the member being substantially circular in cross-section and said coil being helical.

7. A packing member as claimed in claim 5 in which the member is substantially circular in cross-section and the coil is helical.

References Cited
UNITED STATES PATENTS

| | | | |
|---|---|---|---|
| 361,298 | 4/1887 | Kilmer | 267—61 |
| 1,862,992 | 6/1932 | Vargha | 267—61 |

FOREIGN PATENTS

| | | |
|---|---|---|
| 124,348 | 4/1931 | Austria. |
| 449,935 | 5/1923 | Germany. |
| 231,199 | 11/1925 | Great Britain. |
| 475,879 | 11/1937 | Great Britain. |

BARRY B. THORNTON, *Primary Examiner.*

TIM. R MILES, *Examiner.*